United States Patent [19]

Weber et al.

[11] Patent Number: 4,624,986

[45] Date of Patent: * Nov. 25, 1986

[54] LOW TEMPERATURE IMPACT RESISTANT CARBONATE POLYMER BLENDS

[75] Inventors: Christian A. Weber, Sanford; William P. Paige, Midland, both of Mich.

[73] Assignee: The Dow Chemical Company, Midland, Mich.

[*] Notice: The portion of the term of this patent subsequent to Jul. 2, 2002 has been disclaimed.

[21] Appl. No.: 638,433

[22] Filed: Aug. 7, 1984

Related U.S. Application Data

[63] Continuation-in-part of Ser. No. 487,477, Apr. 22, 1983, Pat. No. 4,526,926.

[51] Int. Cl.$^4$ .................... C08L 51/04; C08L 69/00
[52] U.S. Cl. ........................... 525/67; 525/92; 525/95
[58] Field of Search ................. 525/67, 92, 95

[56] References Cited

U.S. PATENT DOCUMENTS 3,130,177 4/1964 Grabowski .
3,880,783 4/1975 Schul et al. .
4,163,762 8/1979 Rudd .................... 525/67
4,205,140 5/1980 Liebig et al. ............ 525/67
4,526,926 7/1985 Weber et al. ............ 525/67
4,550,138 10/1985 Paddock et al. ......... 525/67

FOREIGN PATENT DOCUMENTS 0024644 3/1981 European Pat. Off. ....... 525/67
42-11496 6/1967 Japan ..................... 525/67
80/00027 1/1980 PCT Int'l Appl. ......... 525/67

*Primary Examiner*—Allan M. Lieberman

[57] ABSTRACT

Blends of carbonate polymer, such as a polycarbonate of bisphenol-A, and a rubber-modified copolymer, such as an acrylonitrile/butadiene/styrene (ABS) resin prepared by mass, bulk or mass suspension polymerization techniques, provide articles which exhibit good low temperature physical properties and can exhibit a low gloss finish. Such blends are particularly useful in the manufacture of molded parts. Such blends are color stable and can exhibit small amounts of yellowing. Such blends are particularly useful in low temperature applications such as below about 0° F.

7 Claims, No Drawings

LOW TEMPERATURE IMPACT RESISTANT CARBONATE POLYMER BLENDS

REFERENCE TO RELATED APPLICATION

This application is a continuation-in-part of copending U.S. patent application Ser. No. 487,477, filed Apr. 22, 1983 U.S. Pat. No. 4,526,926.

BACKGROUND OF THE INVENTION

This invention relates to blends of carbonate polymers with rubber-modified monovinylidene aromatic polymers.

Carbonate polymers derived from reactions of dihydroxyorganic compounds, particularly the dihydric phenols, and carbonic acid derivatives such as phosgene have found extensive commercial application because of their excellent physical properties. These thermoplastic polymers appear suitable for the manufacture of molded parts wherein impact strength, rigidity, toughness, heat resistance, excellent electrical properties, glass-like transparency and good clarity are required.

Unfortunately, however, these polymers are expensive in price and require a high amount of energy expenditure in extrusion and molding processes. In order to reduce the cost of processing carbonate polymers, said polymers may contain additives that reduce costs and lower the temperatures required for molding processes. The blends resulting from the processing of carbonate polymer and additive generally exhibit improved melt flow properties at the sacrifice of other desirable features such as heat resistance, impact strength, and the like. In addition, blends of carbonate polymer and additive often exhibit an undesirable, glossy finish.

Another disadvantage of carbonate polymers is that such polymers exhibit low temperature impact strengths which are severely reduced from those impact strengths which are exhibited at room temperature (i.e., about 20° to about 25° C.). Such poor low temperature properties of such polymers severely limit the use of said polymers in exterior applications when articles prepared from said polymers are exposed to great fluctuations in temperature, especially at low temperatures. Blends of carbonate polymer and additive generally do not exhibit to any significant extent improved low temperature impact strengths of the carbonate polymer.

In view of the deficiencies of the conventional carbonate polymers and blends thereof, it would be highly desirable to provide an economical carbonate polymer composition which exhibits exceedingly high low temperature impact strength and improved processability while retaining, to some degree, the desirable properties characteristic of carbonate polymers such as room temperature impact strength and heat resistance, and which is additionally capable of exhibiting a very low gloss finish.

SUMMARY OF THE INVENTION

The present invention is a process for using carbonate polymer blends in a molded article which article is employed at less than about 0° F., the improvement which comprises employing as such a molded or extruded article exhibiting an impact strength at 0° F. of at least 50 percent of that impact strength of the article at 70° F., said article comprising a carbonate polymer blended with a functionally effective amount of a rubber-modified copolymer comprising a monovinylidene aromatic monomer, an $\alpha,\beta$-ethylenically unsaturated comonomer having a pendant polar group, and a rubber component. The rubber-modified copolymer is a composition prepared using mass, bulk or mass suspension polymerization techniques.

In another aspect, the present invention is a process for preparing a molded or extruded article exhibiting an impact strength at 0° F. of at least 50 percent of that impact strength at 70° F., wherein a carbonate polymer is blended with a functionally effective amount of a rubber-modified copolymer comprising a monovinylidene aromatic monomer, an $\alpha,\beta$-ethylenically unsaturated comonomer having a pendant polar group, and a rubber component. The rubber component is present in said rubber-modified copolymer as a composition prepared using mass, bulk or mass suspension polymerization techniques.

The articles of this invention can be characterized by an opaque, low gloss, off-white color. In addition, the articles of this invention can yield color-stable molded products which are resistant to yellowing and can be colored by a wider range of colorants, dyes and pigments. By "low gloss" is meant that a molded object of this invention exhibits a gloss of less than about 70 percent as calculated using a 60° Gardner gloss Laboratory Instrument, Model No. 260.

The carbonate polymer blends of this invention are suitably employed in most applications in which carbonate polymers and rubber-modified polymers have previously been utilized. In addition, the carbonate polymer blends of the present invention are used in applications where a dull, matte finish is desirable. Low gloss and low temperature impact resistant articles are particularly useful in applications such as instrument panels, consoles, garnish moldings, and other automotive interior or exterior parts, automotive trim and ornaments, interior and exterior panels for recreational vehicles, housings for electrical appliances and business machines, appliance cabinets and other such cabinets, and the like. The articles are particularly useful as highly impact resistant cryogenic containers.

DETAILED DESCRIPTION OF THE EMBODIMENTS

The carbonate polymers employed in the present invention are advantageously aromatic carbonate polymers such as trityl diol carbonates described in U.S. Pat. Nos. 3,036,036; 3,036,037; 3,036,038 and 3,036,039; carbonate polymers of bis(ar-hydroxyphenyl)alkylidenes (often called bisphenol-A type diols) including their aromatically and aliphatically substituted derivatives such as disclosed in U.S. Pat. Nos. 2,998,835; 3,038,365 and 3,334,154; and carbonate polymers derived from other aromatic diols such as described in U.S. Pat. No. 3,169,121.

It is understood, of course, that the carbonate polymer may be derived from two or more different dihydric phenols or a copolymer of a dihydric phenol with a glycol or with a hydroxy or acid terminated polyester or with a dibasic acid in the event a carbonate copolymer or interpolymer rather than a homopolymer is desired. Also suitable for the practice of this invention are blends of any of the above carbonate polymers. Also included in the term "carbonate polymer" are the ester carbonate copolymers of the types described in U.S. Pat. Nos. 3,169,121; 4,330,662 and 4,105,633. Of the aforementioned carbonate polymers, the carbonate polymers of bisphenol-A are preferred. Methods of preparing carbonate polymers for use in the practice of this invention are well known, for example, several suitable methods are disclosed in the aforementioned patents which are hereby incorporated by reference in their entirety.

The rubber component of the rubber-modified copolymer can include polyurethane rubber, ethylene/vinyl acetate rubber, silicone rubber, ethylene propylene diene rubbers, ethylene propylene rubbers, chloroprene rubbers, acrylate rubbers, diene rubbers such as butadiene, isoprene, piperylene, and the like.

The preferred rubbers are diene rubbers or mixtures of diene rubbers, i.e., any rubbery polymers (a polymer having a second order transition temperature not higher than 0° C., preferably not higher than −20° C., as determined by ASTM Test D-746-52T) of one or more conjugated 1,3-dienes. Such rubbers include homopolymers and interpolymers of conjugated 1,3-dienes with up to an equal amount by weight of one or more copolymerizable monomers, such as the monoethylenically unsaturated polar monomers and monovinylidene aromatic monomers described hereinafter.

For the purposes of this invention, a polar monomer is a polymerizable ethylenically unsaturated compound bearing a polar group having a group moment in the range from about 1.4 to about 4.4 Debye units and determined by Smyth, C. P., *Dielectric Behavior and Structure*, McGraw-Hill Book Company, Inc., New York (1955). Exemplary polar groups include —CN, —NO$_2$, —CO$_2$H, —OH, —Br, —Cl, —NH$_2$ and —OCH$_3$. Preferably, the polar monomer is an ethylenically unsaturated nitrile such as acrylonitrile, methacrylonitrile and fumaronitrile, with acrylonitrile being especially preferred. Examples of such other polar monomers include $\alpha,\beta$-ethylenically unsaturated carboxylic acids and their anhydride, and alkyl, aminoalkyl and hydroxyalkyl esters such as acrylic acid, methacrylic acid, itaconic acid, maleic anhydride, ethyl acrylate, butyl acrylate, methyl methacrylate, hydroxyethyl and hydroxypropyl acrylates, aminoethyl acrylate, and the like.

Exemplary of the monovinylidene aromatic monomers are styrene; alpha-alkyl monovinylidene monoaromatic compounds (e.g., alpha-methylstyrene, alpha-ethylstyrene, alpha-methylvinyltoluene, alpha-methyl dialkylstyrenes, etc.); ring-substituted alkyl styrenes (e.g., ortho-, meta-, and paravinyl toluene, o-ethylstyrene; p-ethylstyrene, 2,4-dimethylstyrene, p-tertiarybutyl styrene, etc.); ring-substituted halostyrenes (e.g., o-chlorostyrene, p-chlorostyrene, o-bromostyrene, 2,4-dichlorostyrene, etc.); ring-alkyl, ring-halosubstituted styrenes (e.g., 2-chloro-4-methylstyrene, 2,6-dichloro-4-methylstyrene, etc.); vinyl naphthalene; vinyl anthracene, etc. If so desired, mixtures of such monovinylidene aromatic monomers can be employed. Particularly preferred is styrene and mixtures of styrene and alpha-methyl styrene.

In addition to the aforementioned monomeric components, it is understood that the rubber-modified copolymer can also contain a relatively small amount, usually less than about 2 weight percent based on the rubber component, of a crosslinking agent, such as divinylbenzene, diallyl maleate, diallyl fumarate, diallyl adipate, allyl acrylate, ethylene glycol dimethacrylate, and the like, provided that such crosslinking does not eliminate the desired elastomeric character of the rubber component.

The rubber-modified copolymer contains a random copolymer of a monovinylidene aromatic monomer and the polar comonomer, a rubber grafted or blocked with a copolymerized mixture of the monovinylidene aromatic monomer and the polar comonomer. The method for preparing the rubber-modified copolymer is particularly critical because the desired improvement of low gloss properties of the heterogeneous blend is achieved due to the presence of large size rubber particles. Accordingly, it is most desirable to prepare the rubber-modified copolymer by the mass or mass suspension type process. Generally, the large size rubber particles contain occlusions which comprise copolymers of the aforementioned monoethylenically unsaturated polar monomers and monovinylidene aromatic monomers. Examples of mass or bulk polymerization techniques are taught in U.S. Pat. Nos. 3,509,237; 3,660,535; 3,243,481; 4,221,833 and 4,239,863, which have been incorporated herein by reference. Large size rubber particles are especially preferred, especially rubber particles having a particle size greater than about 0.5 microns. Such large size rubber particles typically vary in size from about 0.8 to about 6, suitably from about 0.9 to about 4, microns as determined by transmission electron micrography.

The rubber-modified copolymers of the present invention comprise from about 3 to about 50, preferably about 5 to about 25, weight percent rubber component, from about 49 to about 96, preferably from about 50 to about 90, monovinylidene aromatic monomer, and from about 1 to about 48, preferably from about 5 to about 25, weight percent monoethylenically unsaturated polar monomer.

The monovinylidene aromatic/ethylenically unsaturated polar copolymer which is either occluded in, grafted to, or compatible with the rubber component is a random copolymer with a solubility parameter in the range from about 9.2 to about 11.2. For the purposes of this invention, solubility parameter of a polymer is defined as the square root of the cohesive energy density of the polymer (e.g., as defined by J. H. Hildebrand et al., in *Solubility of Nonelectrolytes*, 3rd Ed., Reinhold Publishing Corp., pages 124–129 (1950).

Preferably, said random copolymer comprises from about 45 to about 99, most preferably from about 65 to about 85, weight percent of the monovinylidene aromatic monomer, which is preferably styrene or a mixture of styrene and alpha-methylstyrene, and from about 1 to about 55, most preferably from about 15 to about 35, weight percent of the polar comonomer, which is preferably an $\alpha,\beta$-ethylenically unsaturated nitrile, particularly acrylonitrile.

It is understood that the impact properties of the resulting heterogeneous blend are greatest when the solubility parameters of the carbonate polymer and the compatible copolymer are equal. A copolymer is considered compatible with a carbonate polymer if it displaces the glass transition temperature of the carbonate polymer. For example, an especially preferred compatible copolymer containing about 16 to about 18 weight percent acrylonitrile and about 82 to about 84 weight percent styrene exhibits a solubility parameter of about 10.1. This solubility parameter matches that of a commercially available polycarbonate prepared from the polymerization of bisphenol-A.

The molecular weight of the rubber-modified copolymer is such that it can be melt blended with the aforementioned carbonate polymer. Preferably, however, the melt flow of the rubber-modified copolymer as determined by ASTM D-1238-65T(I) is from about 0.01 to about 10, more preferably from about 0.1 to about 5, and most preferably from about 2 to about 3, grams per 10 minutes.

Critical to one desirable aspect of the present invention is that large size rubber particles dispersed within the rubber-modified copolymer, whether the mass, bulk, or mass suspension produced occluded particles provide a rubber-modified copolymer which, when blended with a carbonate polymer, provides a heterogeneous blend exhibiting a low gloss finish. It is understood that the larger the size of the rubber particle, the lower the gloss of said heterogeneous blend. It is also understood that small size rubber particles (i.e., emulsion produced particles or particles of the types described hereinbefore of particle size less than about 0.5 micron) can be present in said heterogeneous blends at the expense of not decreasing the gloss of the resulting blend. Thus, it is most desirable to employ a rubber-modified copolymer that contains a minimum number of small size particles.

In the preparation of the article of the present invention, the polymeric components are combined by conventional mixing techniques such as admixing of granular or particulate polymeric components and subsequent malaxation of components at temperatures sufficient to cause heat plastification thereof. Alternatively, the blends may be prepared by heat plastifying the higher melting polymeric components and adding the other components thereto either in granular or heat plastified form. When two rubber-modified components are being employed (e.g., a mixture of mass produced and emulsion coagulated rubber particle rubber modified copolymers), it is generally desirable to combine said rubber-modified copolymers into a uniform mixture prior to combining with carbonate polymer.

One particularly convenient method for preparing the carbonate polymer blend in accordance with the present invention is to dry blend a particulate of the carbonate polymer with a particulate of the rubber-modified copolymer and directly feed this dry blend into a heat fabricating apparatus such as a screw extruder. Less desirably, a reciprocating screw injection molding machine is employed. The particular manner of mixing these components in heat plastified form is not critical but sufficient working should be employed to ensure a uniform distribution of each of the components throughout the resulting polycarbonate composition. In addition of the foregoing mixing procedures, other conventional mixing procedures may be employed including hot roll milling, kneading and the like.

Conditions such as mold surface temperature (i.e., the temperature of the surface of the mold cavity) during injection molding is relevant in obtaining controlled gloss and highly impact resistant articles. That is, mold temperatures of about 40° F. to about 200° F., preferably from about 80° F. to about 125° F. during molding can be employed. The surface of the mold can have a grain surface in order to provide a further low gloss appearance to the molded article.

Conditions such as barrel temperature during injection molding of the components is also relevant in obtaining controlled gloss and highly impact resistant articles. That is, barrel temperatures during molding generally range from about 400° F. to about 600° F. with a range from about 425° F. to about 500° F. being preferred.

Improper melt blending causes poor dispersion of the rubber-modified component in the carbonate polymer. This results in increased gloss of the molded products, and decreases the heat deflection temperature and the impact resistance of the blend. For example, it is desirable to not overly disintegrate the size of the rubber particles of the rubber modified copolymers. In addition, it is highly desirable to not thermally degrade the rubber component (i.e., by employing a barrel temperature much above 600° F. or using other severe compounding conditions).

The carbonate polymer compositions of the present invention are heterogeneous blends wherein the essential components, i.e., the carbonate polymer and rubber-modified copolymer, exist as at least two separate and distinct phases. The proportions of the blend components are not particularly critical and each component can generally vary depending on the gloss and physical properties desired. So long as there is sufficient amount of each component to provide the impact resistance described herein, proportions of the blend components within the aforementioned range of proportions are suitable. Preferably, however, the blend comprises from greater than about 20 to about 95 weight percent carbonate polymer, most preferably about 30 to about 70 weight percent, and from about 5 to less than about 80 weight percent of the rubber-modified copolymer, most preferably about 30 to about 70 weight percent. An especially preferred blend comprises from about 40 to about 60 weight percent carbonate polymer, and from about 40 to about 60 weight percent rubber-modified copolymer.

The carbonate polymer containing compositions can exhibit a gloss significantly lower than those blends previously known in the art. It is believed that the mass polymerized rubber-modified components, yield a large particle size rubber phase which, when thoroughly dispersed into the carbonate polymer, results in low gloss molded compositions. It is also understood that the gloss of the blends of this invention can be further reduced by providing a surface which is rough in texture rather than smooth. It is also understood that typically the larger the particle size of the rubber component the lower the gloss exhibited by the compositions of this invention. It is also understood that the addition of a dark dye or pigment can act to further decrease the gloss of the compositions of this invention. In addition, it is understood that the gloss of the compositions of this invention can be decreased by employing large amounts of rubber modified component relative to the carbonate polymer component. However, large amounts of rubber-modified components also tend to yield a decrease in the good physical properties exhibited by a composition comprising high amounts of carbonate polymer.

The articles of this invention exhibit high flexural modulus (i.e., compared to carbonate polymer at 70° F.) and good elongation (i.e., compared to carbonate polymer at 70° F.). The low temperature notched izod impact strength of the articles of this invention are exceedingly high as compared to that exhibited by an essentially pure carbonate polymer at the same temperature. By the term "low temperature" is meant a temperature of at most 0° F., most preferably in the range of about −20° F. to about 0° F. The impact strength of the articles of this invention can vary depending upon the temperature at which the article is tested. The impact strength of articles of this invention at 0° F. is preferably greater than 50 percent than that of the article at 70° F. and greater than that of essentially pure carbonate polymer which is measured at 0° F. Most desirably, the impact strength of the article of this invention at 0° F. is greater than 80 percent than that of the article at 70° F. The ductile failure of articles of this invention typically occur much below 0° F. and very frequently below about −20° F., both of which temperatures are significantly below that temperature at which brittle failure occurs for essentially pure carbonate polymer.

In addition to the aforementioned polymeric components, it is sometimes desirable to incorporate other additives into the blend. In this regard, such additives as stabilizers, lubricants, plasticizers, antioxidants, fire retardants, fillers, reinforcing fibers such as glass fibers, pigments and the like can be employed in the blends of this invention in a manner similar to the employment of such additives in conventional carbonate polymer blends. For example, the addition of conventional fire retardant additives to the rubber modified phase provides articles of this invention with good impact and flexural properties while still exhibiting good heat resistant characteristics.

The following examples are given to further illustrate the invention and should not be considered as limiting the scope thereof. All percentages are in weight percent unless otherwise noted.

EXAMPLE 1

An ABS resin which is mass produced and comprises about 15.7 percent rubber, about 22.8 percent acrylonitrile, about 49.5 percent styrene, and about 12.0 percent α-methyl-styrene is melt blended into a homopolymer of bisphenol-A having a melt index of 10.08, by total feeding on a Werner Pfleiderer ZSK-30 compounding extruder under the following conditions: barrel temperature=536° F., screw RPM=400, percent torque observed=50, melt temperature=500° F., vent vacuum=29 inches mercury, rate of feed of ABS and polycarbonate in pounds per hour=20 to 21. The pelletized blend is dried at 220° F. for 4 hours prior to injection molding and is injection molded into a 2-in. disc and tensile bars on a 30 ton Newbury molding machine.

Samples are prepared comprising 60 percent ABS resin and 40 percent polycarbonate. Similarly, samples comprising PC/ABS in amounts of 50/50, 40/60, 30/70 and 20/80 are prepared. Such samples are designated as Sample Nos. 1–5. The mold temperature during molding of all of the above described blends is 100° F. and the barrel temperature is 500° F. For comparison purposes, Sample No. C-1 is prepared, which sample comprises 100 percent polycarbonate. The melt temperature during molding of the Comparative Sample No. C-1 is 600° F. and the mold temperature during molding is 200° F. Comparative Sample No. C-2 comprises 80 percent polycarbonate and 20 percent ABS resin. The Comparative Sample No. C-2 is extruded and molded under conditions similar to Sample Nos. 1–5. Comparative Sample No. C-3 is a commercially available ABS/polycarbonate blend. It is molded at a mold temperature of 160° F. and the barrel temperature is 525° F.

The physical properties of the above-described compositions are measured and the results are disclosed in Table I.

TABLE I

| Sample No. | Description[1] PC/ABS | 60° Gloss[2] | HDUF[3] (°F.) | Notched Izod Impact[4] at 75° F. | at 0° F. |
|---|---|---|---|---|---|
| 1 | 60/40 | 68.2 | 223 | 12.5 | 9.2 |
| 2 | 50/50 | 57.1 | 215 | 14.2 | 10.9 |
| 3 | 40/60 | 46.5 | 201 | 14.6 | 12.9 |
| 4 | 30/70 | 42.4 | 198 | 8.7 | 6.4 |
| 5* | 20/80 | 37.5 | 188 | 4.1 | 1.8 |
| C-1* | 100/0 | 97.5 | 260 | 18.2 | 2.4 |
| C-2 | 80/20 | 95.2 | 237 | 11.6 | 7.8 |
| C-3* | — | 99 | 224 | 10.4 | 3.5 |

*Not an example of the invention.
[1]Description of blend is a representation of percent polycarbonate and percent ABS resin in blend.
[2]Measured using a Gardner Laboratory Instrument, Model No. 260.
[3]Heat deflection under load (HDUL) measured at 264 psi as per ASTM D-648.
[4]Measured in ft. lb./in. as per ASTM D-256.

The data in Table I indicates that Sample Nos. 1–5 exhibit gloss below 70 percent. Conversely, the comparative samples exhibit undesirably high gloss in excess of 95 percent. The data also indicates the excellent heat deflection of the ABS resin/polycarbonate blend as well as the good impact resistance of said blends. It is also noted that the impact resistance of Sample Nos. 1–4 greatly exceeds that of polycarbonate when measured at 0° F.

EXAMPLE 2

An ABS resin which is mass produced and comprises about 15.7 percent rubber, about 22.8 percent acrylonitrile, about 49.5 percent styrene, and about 12.0 percent α-methyl-styrene is melt blended into a homopolymer of bisphenol-A having a melt index of 10.1, by total feeding on a Werner Pfleiderer ZSK-30 compounding extruder under the following conditions: barrel temperature profile is 249° C., 276° C., 283° C., 286° C., 278° C., 270° C., screw RPM=400, percent torque observed=55, melt temperature=530° F., (vent vacuum=29 inches mercury), die pressure=110 psi, rate of feed of ABS and polycarbonate in pounds per hour=27.5. The dried pelletized blend is injection molded into a 2-in. disc on a 30 ton Newbury molding machine under the following conditions: barrel temperature profile=485° F., 505° F., 500° F., mold temperature=100° F., injection time=8 seconds, cooling time=30 seconds, melt temperature=500° F., injection pressure=471 psi, back pressure=52 psi.

A sample is prepared comprising 50 percent ABS resin and 50 percent polycarbonate. For comparison purposes, Sample No. C-4 is prepared, which sample comprises essentially 100 percent polycarbonate. The melt temperature during molding is 600° F. and the mold temperature is 200° F. Comparative Sample No. C-5 comprises only the ABS resin. The Comparative Sample No. C-5 is molded under conditions similar to Sample No. 5. Comparative Sample No. C-6 is a commercially available ABS/polycarbonate blend. It is molded at a melt temperature of 500° F. and a mold temperature of 100° F.

The physical properties of the above-described compositions are measured and the results are disclosed in Table II.

TABLE II

| Sample No | Description[1] PC/ABS | Notched Izod Impact[2] at 73° F. | at 0° F. |
|---|---|---|---|
| 6 | 50/50 | 11.4 | 10.9 |
| C-4* | 100/0 | 15.2 | 2.4 |
| C-5* | 0/100 | 3.8 | 1.3 |

TABLE II-continued

| Sample No | Description[1] PC/ABS | Notched Izod Impact[2] at 73° F. | at 0° F. |
|---|---|---|---|
| C-6* | — | 11.5 | 3.5 |

*Not an example of the invention.
[1]Description of blend is a representation of percent polycarbonate and percent ABS resin in blend.
[2]Measured in ft. lb. /in. as per ASTM D-256.

The data in Table II indicates that Sample No. 6 exhibits good high impact resistance, which greatly exceeds that of polycarbonate (i.e., Sample No. C-4) when measured at 0° F.

EXAMPLE 3

Sample No. 7 is prepared by melting blending a mass produced ABS resin which is about 6.5 percent butadiene, about 17 percent acrylonitrile and about 76.5 percent styrene, and is sold commercially as ABS ® 213 by the Dow Chemical Company with a homopolymer of bisphenol-A having a melt index of 8.83 in the ratio of 55 parts polycarbonate and 45 parts ABS resin in a Werner Pfleiderer ZSK-57 compounding extruder under the following conditions: barrel temperature setting=275° C., screw speed=500 rpm, vent vacuum=24 inches mercury, feed rate of polycarbonate and ABS resin in pounds per hour=900, melt temperature=268° C.

Sample No. 8 is prepared by melt blending the ABS resin described in Example 1 with a homopolymer of bisphenol-A having a melt index of 8.83 in the ratio of 55 parts polycarbonate and 45 parts ABS resin in a Werner Pfleiderer ZSK-57 compounding extruder under the following conditions: barrel temperature setting=275° C., screw speed=500 rpm, vent vacuum=24 inches mercury, feed rate of polycarbonate and ABS resin=900 pounds per hour, melt temperature=274° C.

Each of the Samples are molded into tensile bars and 2-inch discs on a 30 ton Newbury molding machine having a barrel temperature set at 525° F. and a mold temperature of 200° F. Sample No. C-7 is molded under similar conditions and is a commercially available resin composition. Physical properties of the compositions are presented in Table III.

TABLE III

| Sample No. | Description[1] PC/ABS | Notched Izod Impact[2] at 73° F. | −20° F. |
|---|---|---|---|
| 7 | 55/45 | 9.7 | 8.3 |
| 8 | 55/45 | 9.6 | 7.5 |
| C-7* | Commercial Blend | 9.7 | 3.6 |

*Not an example of the invention.
[1]See footnote 1 of Table II.
[2]See footnote 2 of Table III.

The data in Table III indicates that Sample Nos. 7 and 8 exhibit good high impact resistances, even at −20° F.

What is claimed is:

1. In a process for using carbonate polymer blends in a molded article which article is employed at less than about 0° F., the improvement which comprises employing as such a molded or extruded article exhibiting an impact strength at 0° F. of at least 50 percent of that impact strength of the article at 70° F., said article comprising a carbonate polymer blended with a functionally effective amount of a rubber-modified copolymer wherein said rubber-modified copolymer comprises from about 5 to about 25 weight percent rubber component, from about 50 to about 90 weight percent monovinylidene aromatic monomer, and from about 5 to about 25 weight percent monoethylenically unsaturated polar monomer, wherein said rubber-modified copolymer is a composition prepared using mass, bulk or mass suspension polymerization techniques and contains a random copolymer of a monovinylidene aromatic monomer and a polar comonomer and a rubber component grafted with a copolymer of the monovinylidene aromatic monomer and the polar comonomer, wherein the carbonate polymer is a homopolycarbonate of bisphenol-A.

2. A process for preparing a molded or extruded article exhibiting an impact strength at 0° F. of at least 50 percent of that impact strength of 70° F., wherein a carbonate polymer is blended with a functionally effective amount of a rubber-modified copolymer, wherein said rubber-modified copolymer comprises from about 5 to about 25 weight percent rubber component, from about 50 to about 90 weight percent monovinylidene aromatic monomer, and from about 5 to about 25 weight percent monoethylenically unsaturated polar monomer, wherein said rubber-modified copolymer is a composition prepared using mass, bulk or mass suspension polymerization techniques and contains a random copolymer of a monovinylidene aromatic monomer and a polar comonomer and a rubber component grafted with a copolymer of the monovinylidene aromatic monomer and the polar comonomer, wherein the carbonate polymer is a homopolycarbonate of bisphenol-A.

3. A process of claim 1 wherein said monovinylidene aromatic monomer is styrene or a mixture of styrene and α-methylstyrene, said monoethylenically unsaturated polar monomer is acrylonitrile and said rubber component is butadiene.

4. A process of claim 1 wherein said rubber-modified copolymer is prepared using mass polymerization techniques.

5. A process of claim 1 wherein said carbonate polymer blend comprises greater than about 20 to about 95 weight percent carbonate polymer, and from about 5 to less than about 80 weight percent rubber-modified copolymer.

6. A process of claim 1 wherein said carbonate polymer blend comprises from about 30 to about 70 weight percent carbonate polymer, and from about 30 to about 70 weight percent rubber-modified copolymer.

7. A process of claim 1 wherein said article exhibits an impact strength at 0° F. of greater than 80 percent than that of said article at 70° C.

* * * * *

UNITED STATES PATENT AND TRADEMARK OFFICE
CERTIFICATE OF CORRECTION

PATENT NO. : 4,624,986
DATED : November 25, 1986
INVENTOR(S) : Christian A. Weber; William P. Paige It is certified that error appears in the above-identified patent and that said Letters Patent is hereby corrected as shown below:

Column 5, line 48, delete the word "of" and insert therefor -- to --.

Column 7, line 64, third column heading of TABLE I, delete "$HDUF^3$" and insert therefor -- $HDUL^3$ --.

Column 8, line 3, third column heading of TABLE I--(continued), delete "$HDUF^3$" and insert therefor -- $HDUL^3$ --.

Signed and Sealed this

Twenty-eighth Day of April, 1987

Attest:

DONALD J. QUIGG

Attesting Officer

Commissioner of Patents and Trademarks